July 23, 1929.  W. B. DAY  1,722,203
TERMINAL PROTECTOR HOOD
Filed Jan. 18, 1924

INVENTORS
W. B. Day,
BY
ATTORNEYS

Patented July 23, 1929.

1,722,203

UNITED STATES PATENT OFFICE.

WILLIAM B. DAY, OF WINCHESTER, KENTUCKY, ASSIGNOR OF ONE-THIRD TO HARRY P. RENICK AND ONE-THIRD TO KELLY B. DAY, BOTH OF PUNTA GORDA, FLORIDA.

TERMINAL PROTECTOR HOOD.

Application filed January 18, 1924. Serial No. 687,078.

My invention relates to improvements in storage batteries, and it consists of the constructions, combinations and arrangements herein described and claimed.

An object of the invention is to provide a hood which is particularly applicable to the positive terminal of a storage battery for the purpose of preventing the corrosion which usually accumulates there from spreading to other parts of the battery.

Another object of the invention is to provide a device for the purpose described, which includes a sleeve by which a part of the positive wire is encased to prevent short circuiting thereof on the battery box and protecting it from acids and fumes.

Figure 1:
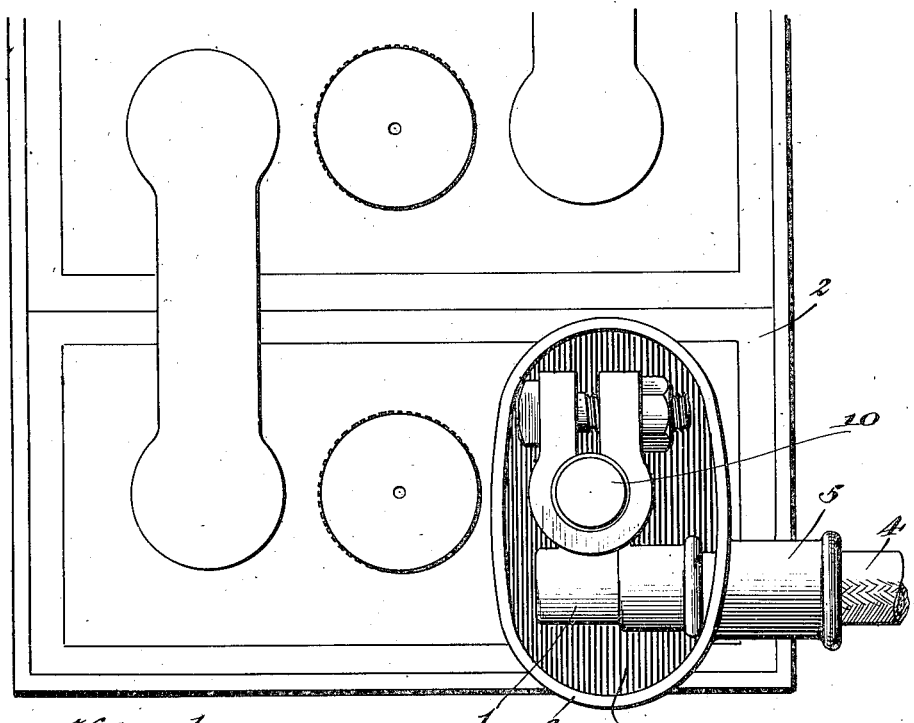
Figure 2:
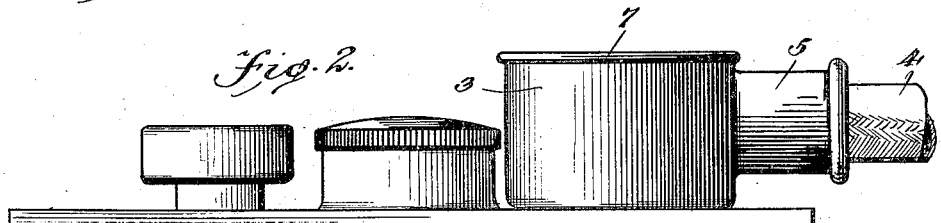
Figure 3:
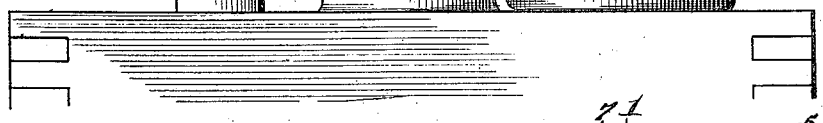

Other objects and advantages will appear from the following specification, reference being had to the accompanying drawing, in which:

Figure 1 is a plan view of enough of a storage battery to illustrate the application of the protecting hood, Figure 2 is a side elevation, Figure 3 is a longitudinal section.

The invention relates to the protection of the terminal 1 of the storage battery 2. This is the positive terminal of the battery and usually is subject to more marked corrosion than the other or negative terminal.

A hood 3 is so made that it constitutes a receptacle completely surrounding the post 10 and terminal 1, (Figure 1) when applied, and also encasing a portion of the positive wire 4 which is connected to the terminal so that the short circuiting of the current will be prevented should the wire by any chance sag sufficiently to touch the box of the storage battery. To this end the hood 3 has a lateral sleeve 5 through which the wire 4 passes as it enters the hood.

The hood includes a bottom 6 which rests on top of the battery and fits tightly around the post 10. A cover 7 closes the hood, and if it be so desired the space inside of the hood may be filled with paraffine. It is intended that the hood shall protect the positive post and terminal from acid and fumes escaping from the battery. Rubber or other suitable material is used in making the hood. The rubber is soft and elastic so that the sleeve 5 may adapt itself to any position taken by the wire 4.

While the construction and arrangement of the improved terminal protecting hood as herein described and claimed is that of a generally preferred form, obviously modifications and changes may be made without departing from the spirit of the invention or the scope of the claims.

I claim:—

A battery terminal protector for application to battery posts composed of a member of yielding material having an opening with a continuous stretchable wall and smaller in size than the post to which it is to be applied, the wall of the opening yielding when said member is forced upon said post producing a friction support and preventing the passage of fumes or acid up the post.

WILLIAM B. DAY.